US008153087B2

(12) United States Patent
Kabai et al.

(10) Patent No.: US 8,153,087 B2
(45) Date of Patent: Apr. 10, 2012

(54) METHOD FOR THE PURIFICATION OF RADIUM FROM DIFFERENT SOURCES

(75) Inventors: Eva Kabai, Eching (DE); Josue Manuel Moreno Bermudez, Ismaning (DE); Richard Henkelmann, Freising (DE); Andreas Turler, Ismaning (DE)

(73) Assignee: Actinium Pharmaceuticals Inc., Florham Park, NJ (US)

( * ) Notice: Subject to any disclaimer, the term of this patent is extended or adjusted under 35 U.S.C. 154(b) by 0 days.

(21) Appl. No.: 12/398,346

(22) Filed: Mar. 5, 2009

(65) Prior Publication Data

US 2010/0104489 A1 Apr. 29, 2010

Related U.S. Application Data

(63) Continuation of application No. PCT/EP2007/007788, filed on Sep. 6, 2007.

(30) Foreign Application Priority Data

Sep. 8, 2006 (DE) .................. 10 2006 042 191

(51) Int. Cl.
 *C01F 13/00* (2006.01)
(52) U.S. Cl. .................. 423/2; 423/1; 423/6; 423/7
(58) Field of Classification Search .................. 423/2
 See application file for complete search history.

(56) References Cited

U.S. PATENT DOCUMENTS

| 554,649 A | 2/1896 | Bowers |
| 2,554,649 A | 5/1951 | Tompkins |
| 2,632,763 A | 3/1953 | Hagemann |
| 4,293,617 A | 10/1981 | Nagy |
| 4,454,106 A | 6/1984 | Gansow et al. |

(Continued)

FOREIGN PATENT DOCUMENTS

DE 103 47459 5/2005

(Continued)

OTHER PUBLICATIONS

Chabaux, A new Ra-Ba chromatographic separation and its application to Ra mass-spectrometric measurement in volcanic rocks, Chemical Geology 114 (1994) 191-197.*

(Continued)

*Primary Examiner* — Melvin Mayes
*Assistant Examiner* — Melissa Stalder
(74) *Attorney, Agent, or Firm* — Wilmer Cutler Pickering Hale and Dorr LLP

(57) ABSTRACT

The present application is directed to a method for the purification of Radium, in particular $^{226}$Ra, for target preparation for an essentially pure $^{225}$Ac production from available radioactive sources, using an extraction chromatography in order to separate chemically similar elements such as Ba, Sr, and Pb from the desired Ra; wherein said extraction chromatography has an extractant system on the basis of a crown ether. The invention is further related to a method for recycling of $^{226}$Ra, for target preparation for $^{225}$Ac production from radium sources irradiated with accelerated protons (p,2n), after separation of the produced $^{225}$AC. In this method a combination of the above extraction chromatography and a cation exchange chromatography is used. The obtained $^{226}$Ra is essentially free of the following chemical contaminants consisting of Ag, Al, As, Be, Bi, Ca, Cd, Co, Cr, Cu, Fe, Ga, K, Li, Mg, Mn, Na, Ni, Pb, Sr, V, Zn, and Ba.

53 Claims, 9 Drawing Sheets

U.S. PATENT DOCUMENTS

| | | | |
|---|---|---|---|
| 4,514,266 A | | 4/1985 | Cole et al. |
| 4,548,790 A | | 10/1985 | Horwitz et al. |
| 4,663,129 A | | 5/1987 | Atcher et al. |
| 4,895,633 A | | 1/1990 | Seto et al. |
| 5,002,885 A | * | 3/1991 | Stavrianopoulos ............ 435/188 |
| 5,085,834 A | | 2/1992 | Lemaire et al. |
| 5,246,691 A | | 9/1993 | Geerlings et al. |
| 5,355,394 A | | 10/1994 | van Geel et al. |
| 5,445,720 A | | 8/1995 | Sypula et al. |
| 5,607,591 A | | 3/1997 | Dozol et al. |
| 5,707,528 A | * | 1/1998 | Berry ............................ 210/663 |
| 5,809,394 A | | 9/1998 | Bray et al. |
| 5,863,439 A | * | 1/1999 | Dietz et al. .................... 210/682 |
| 5,885,465 A | | 3/1999 | Bray et al. |
| 6,299,666 B1 | | 10/2001 | Apostolidis et al. |
| 6,511,603 B1 | | 1/2003 | Dietz et al. |
| 6,635,234 B1 | | 10/2003 | Larsen et al. |
| 7,106,438 B2 | * | 9/2006 | Morrisroe et al. ............ 356/316 |
| 7,378,372 B2 | * | 5/2008 | Sylvester ...................... 502/416 |
| 2003/0127395 A1 | | 7/2003 | Bond et al. |
| 2003/0194364 A1 | | 10/2003 | Bond et al. |
| 2003/0219366 A1 | | 11/2003 | Horwitz et al. |
| 2005/0211955 A1 | * | 9/2005 | Meikrantz et al. ............ 252/364 |
| 2007/0076834 A1 | | 4/2007 | Moreno Bermudez et al. |
| 2007/0153954 A1 | | 7/2007 | Harfensteller et al. |
| 2009/0191122 A1 | | 7/2009 | Moreno Bermudez et al. |

FOREIGN PATENT DOCUMENTS

| | | |
|---|---|---|
| DE | 10 2005 043 012.0 | 9/2005 |
| DE | 10 2004 022 200 A1 | 12/2005 |
| DE | 10 2006 042 191 A1 | 9/2006 |
| DE | 10 2006 008 023 A1 | 8/2007 |
| EP | 0 443 479 B1 | 7/1994 |
| EP | 0 752 709 B1 | 3/1999 |
| EP | 0 752 710 B1 | 11/1999 |
| EP | 962942 A1 * | 12/1999 |
| EP | 1 673 492 B1 | 3/2009 |
| JP | 04326096 A | 11/1992 |
| WO | WO-98/55201 | 12/1998 |
| WO | WO-99/63550 A1 | 12/1999 |
| WO | WO-2005/039634 | 5/2005 |
| WO | WO-2005/039647 A2 | 5/2005 |
| WO | WO-2005/105160 | 11/2005 |
| WO | WO-2007/096119 | 8/2007 |
| WO | WO-2008/028664 A1 | 3/2008 |

OTHER PUBLICATIONS

International Search Report and Written Opinion issued for corresponding International Patent Application No. PCT/EP2007/007788.
Rompp Lexikon Chemie 10th Edition, 1997, pp. 1965-1966.
Kirby, H.W. et al., "The Radiochemistry of Radium," National Academy of Sciences, National Research Council, Nuclear Science Series, Issued Dec. 1964.
Gleason, et al., (1980), "An Improved Ion Exchange Procedure for the Separation of Barium from Radium," Ann Arbor Science Publishers Inc., p. 47-50.
van der Walt, T.N. et al., (1983), "Quantitative Separation of Gallium from other Elements by Cation-Exchange Chromatography," Anal. Chem., 55: 212-216.
Haissinsky, M.J., "Electrolyse de sels de baryum et de radium dans l'acetone," ("Electrolysis of salts of barium and radium in acetone") Chim. Phys. (1937) 34, 323-325 (with English translation of summary).
Burnett, W. et al. (1995), "Determination of Radium-228 in Natural Waters Using Extraction Chromatographic Resins." Radioactivity & Radiochemistry. vol. 6, No. 3, p. 36-44.
Apostolidis et al., 2005, "Cyclotron Production of Ac-225 for Targeted Alpha Therapy", Appl. Radiat. Isot., 62:383-387.
Chiarizia, R. et al. "Uptake of Metal Ions by a New Chelating Ion-Exchane Resin. VII. Alkaline Earth Cations" Solevent Extraction and Ion Exchange, 13(6), 1063-1082 (1995).
Geerlings et al., "The feasibility of $^{225}$Ac as a source of α-particles in radioimmunotherapy," Nuclear Medicine Communications 14: 121-125 (1993).
Geerlings, M.W. "Radionuclides for radioimmunotherapy: criteria for selection," Int. J. Biol. Markers, 8: 180-186 (1993).
Gerlach, V.W. et al. "Zeitschrift fur anorganische und allgemeine Chemie" Band 221 (1934), 103 (witn English Summary).
Haissinsky, M.J., "Electrolyse de sels de baryum st de radium dans l'acetone," ("Electrolysis of salts of barium and radium in acetone") Chim. Phys. 34, 321 (with English translation of summary), 2006.
Hassfjell et al., "The Development of the α-Particle Emitting Radionuclides $^{212}$Bi and $^{213}$Bi, and Their Decay Chain Related Radionuclides, For Therapeutic Applications," Chem. Rev., 101: 2019-2036 (2001).
Honigschmid, V.O. et al., "Zeitschrift fur anorganische und allgemeine Chemie," Band 221 (1934), 65 (with English Summary).
Huber et al., "Locoregional α-Radioimmunotherapy of Intraperitoneal Tumor Cell Dissemination Using a Tumor-specific Monoclonal Antibody," Clinical Cancer Research (Suppl.) 9:1s-6s (2003).
Huber, Roswitha, "Bewertung der lokoregionalen Radioimmuntherapie disseminierter Tumorzellen des diffusen Magenkarzinoms mit einem $^{213}$Bi gekoppelten tumorspezifischen Antikörper im Mausmodell" (Evaluation of a locoregional radioimmunotherapy of disseminated tumor cells of the diffuse gastric carcinoma with a $^{213}$Bi bound tumor specific antibody in the mouse model), doctorate dissertation in the Faculty of Veterinary Medicine submitted to the Ludwig-Maximilians-University of Munich, Jul. 18, 2003 (English Summary—pp. 108-109).
Ingelbrecht, C. et al.: "Improved electrodeposited actinide layers," Nuclear Instruments and Methods in Physics Research A 397 (1997) 34-38.
International Search Report and Written Opinion of International Patent Application No. PCT/EP2004/011510, filed Oct. 13, 2004.
International Search Report and Written Opinion of International Patent Application No. PCT/EP2005/002619 filed Mar. 11, 2005.
International Search Report and Written Opinion, International Patent Application No. PCT/EP2007/007788 mailed Dec. 17, 2007.
International Search Report and Written Opinion, International Patent Application No. PCT/EP2007/01424 mailed Aug. 22, 2007.
Johnson et al., 1998, "A 222Rn Source for Low-Background Liquid Scintillation Detectors", Nucl. Instrum. & Meth. Physics Res., 414: 459-465.
Jurcic et al., "Target α particle immotherapy for myeloid leukimia," in Blood, 100: 1233-1239 (2002).
Kabai, E. "Radium purification for cyclotron target preparation for $^{225}$Ac Production": Sep. 11 to Sep. 14, 2005 Dusseldorf, Techische Universitat Munchen, Institut fur Radiochemie, 1-14.
Kabai, E. et al., "Simultaneous determination of radioactive halogen isotopes and $^{99}$Tc," Czechoslovak Journal of Physics, vol. 53 (2003), Suppl. A., A181-A188.
Kaspersen, et al., "Cytotoxicity of 213Bi- and 225Ac -immunoconjugates," Nuclear Medicine Communications, 16:468-476 (1995).
Mirzadeh, S., "Generator-produced Alpha-emitters," Appl. Radiat. Isot., vol. 49, No. 4, pp. 345-349, 1998.
Moon, D.S. et al., "Concentration of radium isotopes from natural waters using MnO$_2$ Resin," Applied Radiation and Isotopes 59 (2003) 255-262.
Mullen, G. et al., "Preparation of Targets of Np, Pu, Am, Cm and Cf by Electrodeposition from Organic Solutions," Nuclear Instruments and Methods 128 (1975) 425-428.
Nelson, F. "Ion Exchange Procedures V. Separation of Barium and Radium," Journal of Chromatography, 16 (1964) 403-406.
Nikula et al., "Alpha-Emitting Bismuth Cyclohexylbenzyl DTPA Constructs of Recombinant Humanized Anti-CD33 Antibodies: Pharmacokinetics, Bioactivity, Toxicity and Chemistry," J Nucl Med, 40:166-176 (1999).
Power, W.H. et al. "Separation of Radium and Barium by Ion Exchange Elution," Analytical Chemistry, vol. 31, No. 6, Jun. 1959, pp. 1077-1079.
Salutsky, M.L. et al., "Radium-Barium Sepraration Process," Industrial and Engineering Chemistry, Oct. 1955, pp. 2162-2166.
Strelow, F.W.E. "Separation of Traces and Large Amounts of Lead from Gram Amounts of Bismuth, Tin, Cadmium, and Indium by Cation Exchange Chromatography in Hydrochloric Acit-Methanol Using a Macroporous Resin," Anal Chem. 1985, 2268-2271.

Tompkins, E.R. "Separatino of Radium from Barium by the Use of an Ion-exchange Column Procedure," J. Am. Chem. Soc. Oct. 1948; 70 (10): 3520-2.

van der Walt, T.N. et al., "Quantitative Separation of Gallium from Other Elements by Cation-Exchange Chromatography," Anal. Chem. 1983, 55, 212.

Vrecek et al., 2004, "Determination of 210Pb and 210Po in Sediment and Soil Leachates and in Biological Materials Using a Sr-Resin Column and Evaluation of Column Reuse", 60: 717-723.

Whitehead, N.E. et al.: "Factors Affecting the Electrodeposition of $^{226}$Ra," Journal of Radioanalytical and Nuclear Chemistry, Articles, vol. 160, No. 2 (1992) 447-485.

Wlodzimirska, B. et al. "Preparation of $^{225}$Ac and $^{228}$Ac generators using a cryptomelane manganese dioxide sorbent," Radiochimica Acta, Sep. 2003, vol. 91, 553-556.

Burnett, W. & Cable, Peter. "Determination of Radium-228 in Natural Waters Using Extraction Chromatographic Resins." Radioactivity & Radiochemistry. vol. 6, No. 3 (1995) 36-44.

Schicha and Schober, (1997) "Nuklearmedizin—CompactLehrbuch," section 2.3.1, pp. 15, Schattauer Gmbh.

Schicha and Schober, (2003) "Nuklearmedizin—Basiswissen und klinische Anwendung," Section 2.3.1, pp. 13-14, Schattauer Gmbh.

\* cited by examiner

Formula I

Formula II

Formula III wherein in the above Formula : X is SO$_3^-$H$^+$

METHOD FOR THE PURIFICATION OF RADIUM FROM DIFFERENT SOURCES

This application is a continuation of International Patent Application No. PCT/EP2007/007788, filed Sep. 6, 2007, which claims the benefit of, and priority to, German Patent Application 10 2006 042 191.4, filed Sep. 8, 2006, and are each herein incorporated by reference in their entirety for all purposes.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

BACKGROUND OF THE INVENTION

Each year 18 out of 100,000 Germans come down with gastric carcinoma. In Japan, 126 out of 100 000 people are affected. This means about 156,000 incidences per year in Japan alone. Similarly, gastric carcinoma is one of the most frequent causes of death in China, Taiwan and Korea. Until present, the most promising therapeutic method for treating such carcinomas has been the application of cytostatica within a chemotherapeutic regimen. However, this approach suffers from significant side effects.

In contrast, radioimmunotherapy approaches use protein structures located on the membrane of tumor cell lines to bind cytotoxic active substances via a carrier. In most cases, overexpression of the binding molecule at the tumor cell is an important variable in this treatment method. Given that the target molecule for the tumor associated antibodies can also be expressed is to a lower extent on the surface of non-tumor cells in the organism, such therapeutic agents can also bind to also binds to non-tumor cells. There is a need to develop improved methods for the purification of radium for use in radioimmunotherapeutic methods. This invention addresses this need.

SUMMARY OF THE INVENTION

The present disclosed subject matter relates to methods purification of Radium, in particular 226Ra.

In one aspect, the disclosed subject matter described herein provides a method for purifying Radium (Ra) for target preparation for 225Ac production from a radioactive source, the method comprising: a) determining the quality of the Ra material to be purified; b) contacting the radioactive source with a mineral acid such that Ra is leached from the radioactive source into the mineral acid to generate a leached pool; c) separating Ra from Ba, Sr, and Pb in the leached pool by extraction chromatography to generate one or more Ra containing factions; d) pooling the Ra containing fractions; and e) concentrating the pooled Ra-containing fractions to generate purified Ra-containing fractions. In one embodiment, the Ra is 226Ra. In another embodiment, step (b) repeated one or more times. In still a further embodiment, the mineral acid in step (b) is diluted $HNO_3$. In still a further embodiment, the $HNO_3$ has a concentration of about 0.1 M. In yet another embodiment, $HNO_3$ or HCl is used as the mobile phase in step (c). In another embodiment, the $HNO_3$ or HCl is used as the mobile phase in step (c) has a concentration range of about 0.1 M to about 4 M. In still a further embodiment, the $HNO_3$ or HCl is used as the mobile phase in step (c) has a concentration of about 1M.

In another embodiment, the leached pool of step (b) is concentrated. In one embodiment, the leached pool is concentrated with an evaporator and redissolved a mineral acid. In one embodiment, the mineral acid is $HNO_3$. In another embodiment, the mineral acid is 0.1 M $HNO_3$.

In one embodiment, $^{222}Rn$ is removed from the leached pool with one or more activated carbon traps.

In another embodiment, the extraction chromatography is performed on a solid support material having an extractant system coated thereon. In one embodiment, the extractant system comprises extraction chromatography such that Ra is contained in early fractions, Ba and Sr are contained in fractions with higher retention time and Pb is retained on the extractant system. In another embodiment, the extractant system comprises at least one compound in accordance with general formula I in at least one compound in accordance with general formula II, wherein in formula I: R8 and R9 independently is H, C1-C6 alkyl, or t-butyl; and wherein in formula II: R10 is C4 to C12 alkyl; and wherein HNO3 or HCl is used as a mobile phase. In another embodiment, the extractant system is a crown ether in accordance with formula III in 1-octanol. In another embodiment, the extractant system is 4,4'-bis(t-butylcyclohexano)-18-crown-6 in 1-octanol. In still a further embodiment, the extractant system is 4,5'-bis(t-butylcyclohexano)-18-crown-6 in 1-octanol. In still a further embodiment, the solid support is selected from the group consisting of: a porous silica, an inert organic polymer and an acrylic ester non-ionic polymer.

In one embodiment, the determining of the quality of the Ra material to be purified is performed by γ-spectrometry. In one embodiment, the γ-spectrometry is in situ γ-spectrometry. In another embodiment, the γ-spectrometry is Inductively Coupled Plasma Optical Emission Spectroscopy (ICP-OES).

In another embodiment, the purified Ra-fractions of step (e) are concentrated by evaporation to dryness by means of an evaporator. In still a further embodiment, purified Ra-fractions of step (e) are concentrated by evaporation to a wet residue by means of an evaporator.

In another aspect, the subject matter described herein provides a method for recycling 226Ra from radium sources irradiated with accelerated protons (p,2n), the method comprising: a) determining the quality of a Ra-containing solution to be purified; b) concentrating the Ra-containing solution by evaporation; c) removing trace amounts of organic compounds from the concentrated Ra-containing solution with a prefilter column; d) separating Ra from chemical contaminants by performing at least one cation exchange chromatography using a cation exchange resin; e) washing the cation exchange resin with low molar mineral acid to remove chemical contaminants; f) eluting Ra from the cation exchange resin with high molar mineral acid to generate partially purified Ra fractions; g) pooling and concentrating the partially purified Ra fractions; and h) subjecting the partially purified Ra-containing fractions to at least one extraction chromatography step, wherein said extraction chromatography step is performed on a solid support material having an extractant system coated thereon, comprising at least one compound in accordance with general formula I in at least one compound in accordance with general formula II, wherein in formula I R8 and R9 independently is H, C1-C6 alkyl, or t-butyl; and wherein in formula II R10 is $C_4$ to $C_{12}$ alkyl; and wherein HNO3 or HCl is used as mobile phase; i) recovering Ra from the early fractions, whereas Ba and Sr are contained in fractions with higher retention time; j) pooling Ra fractions; and k) concentrating the purified Ra-containing fractions.

In one embodiment, the 226Ra is recycled from radium sources irradiated with accelerated protons (p,2n) to prepare targets for 225Ac production. In another embodiment, the 226Ra is recycled from radium sources irradiated with accelerated protons (p,2n) after it is separated from 225Ac. In a further embodiment, the partially purified Ra-factions of step (g) contain Ra as well as other chemically similar elements, such as Ba and Sr.

In another embodiment, the solution in step (a) is a mineral acid solution. In yet another embodiment, the prefilter column is an inert solid support material. In still a further embodiment, the cation exchange chromatography of step (d) is performed on a cation exchanger. In one embodiment, the cation exchanger is an acidic macroporous cation exchanger.

In another embodiment, the Ra-containing solution in step (a) comprises HCl or $HNO_3$. In another embodiment, the $HNO_3$ is within a concentration range of about 0.5 M to about 4 M. In still a further embodiment, the HCl is within a concentration range of about 0.5 M to about 4 M. In yet another embodiment, $HNO_3$ or HCl is used as mobile phase has a concentration range of about 0.1 M to about 4 M. In still a further embodiment, the $HNO_3$ or HCl is used as mobile phase has a concentration of about 1 M.

In one embodiment, the main chemical contaminants are selected from the group consisting of Ag, Al, As, Be, Bi, Ca, Cd, Co, Cr, Cu, Fe, Ga, K, Li, Mg, Mn, Na, Ni, Pb, Sr, V, Zn, as well as mixtures thereof.

In still a further embodiment, the concentration steps are carried out by evaporation.

In another embodiment, 222Rn decay products are removed from the Ra material with one or more activated carbon traps.

In one embodiment, the concentration of the high molar mineral acid of step (f) is about 0.5 to about 10 M. In another embodiment, the concentration of the high molar mineral acid of step (f) is about 2 to about 6 M. In still a furthern embodiment, the concentration of the high molar mineral acid of step (f) is about 4 M.

In one embodiment, the high molar mineral acid is $HNO_3$. In another embodiment, the cation exchanger is an acidic cation exchange resin. In still a further embodiment, the cation exchanger is an acidic macroporous type cation exchange resin. In yet another embodiment, the cation exchanger is a resin accordance with the following formula shown in FIG. 10, wherein X is SO3-H+.

In still a further embodiment, the extractant system of step (h) is a crown ether in accordance with formula III in 1-octanol. In yet another embodiment, the extractant system is 4,4'-bis(t-butylcyclohexano)-18-crown-6 in 1-octanol. In still a further embodiment, the extractant system is 4,5'-bis(t-butylcyclohexano)-18-crown-6 in 1-octanol.

In one embodiment, the solid support in step (h) is a porous silica or an inert organic polymer. In still a further embodiment, the solid support in step (h) is an acrylic ester non-ionic polymer.

DETAILED DESCRIPTION OF THE INVENTION

Figure 1:
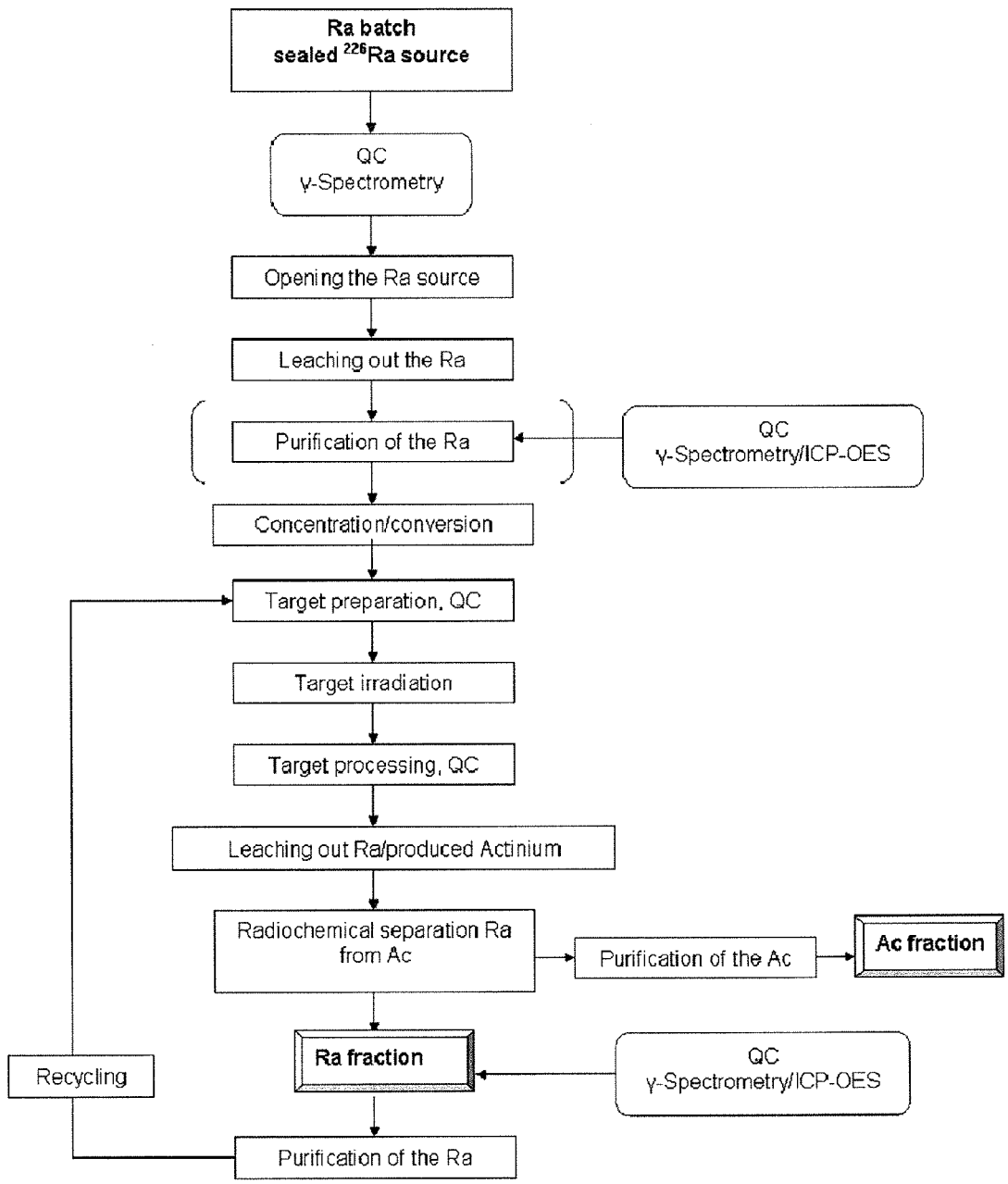
FIG. 1. A general scheme of the production of $^{225}$Ac via $^{226}$Ra(p,2n) 225Ac reaction.

The issued patents, applications, and other publications that are cited herein are hereby incorporated by reference to the same extent as if each was specifically and individually indicated to be incorporated by reference.

DEFINITIONS

The singular forms "a," "an," and "the" include plural reference unless the context clearly dictates otherwise.

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%.

The present invention relates to a method for radium purification, in particular $^{226}$Ra, for the preparation of targets for $^{225}$Ac production from available radioactive sources. In one aspect, the invention also relates to a method for recycling of $^{226}$Ra, for the preparation of targets for $^{225}$Ac production from radium sources irradiated with accelerated protons (p,2n) after separation of the produced $^{225}$AC.

The investigations and experimental work of the present invention was carried out at the Technical University of Munich [TUM], Institute of Radiochemistry [RCM].

The radionuclide $^{225}$AC can be used in nuclear medicine in various clinical trials in the treatment of cancer, for example by binding to tumor specific antibodies. Also useful for such purposes is its daughter nuclide $^{213}$Bi.

The radioactivity of α-emitters is more than 1000 times lower than that of β-emitters. This property is an important criteria for the selection of radionuclides for immunotherapy GEERLINGS, M. W. (1993): Int. J. Biol. Markers, 8, 180-186: "Radionuclides for radioimmunotherapy: criteria for selection").

The α-emitting radionuclide $^{225}$Ac and its daughter isotope $^{213}$Bi are promising for the objects of radioimmunotherapy. Although other α-emitting radionuclides, such as $^{211}$At, $^{255}$Fm, $^{212}$Bi/$^{212}$Pb, $^{224}$Ra, $^{233}$Ra can also be used, they suffer from poor availability or from their inability to form stable conjugates.

One of the fundamental studies for the foundation of a radioimmunotherapy with α-emitters is disclosed In GEERLINGS, M. W., KASPERSEN, F. M., APOSTOLIDIS; C. AND VAN DER HOUT, R. (1993): Nuclear Medicine Communications 14, 121-125, "The feasibility of $^{225}$Ac as a source of α-particles in radioimmunotherapy". $^{225}$Ac produced from $^{229}$Th and $^{213}$Bi, the daughter isotope of $^{225}$Ac, are suitable isotopes for the radioimmunotherapy with α-emitters. These α-emitters are particularly suitable for cancer treatment and for the treatment of micrometastases of malignant tumors using tumor-specific monoclonal antibodies as carriers for the α-emitters.

A further study of KASPERSEN, F. M., BOS, E., DOORNMALEN, A. V., GEERLINGS, M. W., APOSTOLIDIS, C. and MOLINET, R. (1995): Nuclear Medicine Communications, 16, 468-476: "Cytotoxicity of $^{213}$Bi- and $^{225}$Ac-immunoconjugates" confirms and quantifies the cytotoxic effect of $^{213}$Bi and $^{225}$Ac with in vitro tests using the human epidermoid tumor cell line A431.

$^{213}$Bi can be used for the treatment of malignant diseases of the blood system. Various radioimmunotherapeutic approaches with $^{225}$AC and $^{213}$Bi are also in various phases of clinical trials for the treatment of cancer.

Two promising therapeutic approaches highlight the medical-clinical significance of the present invention for the preparation of $^{225}$AC from $^{226}$Ra by means of accelerated protons.

$^{213}$Bi bound to HuM195, a formulation of a monoclonal anti-CD33 antibody, has been used successfully for the treatment of patients with acute myelogenous leukemia (AML) and chronic myelogenous leukemia (CML) (JURCIC, J. G., LARSON, S. M., SGOUROS, G., McDEVITT, M. R., FINN, R. D., DIVGI, C. R. Åse, M. B,: HAMACHER, K. A,: DANGSHE, M., HUMM, J. L., BRECHBIEL, M. W., MOLINET, R., SCHEINBERG, D. A. (2002) in Blood, 100, 1233-1239). This study was the first proof-of-concept where a human being was treated with a systemic radioimmunotherapy comprising an α-emitter transported to a tumor specific cellular target.

Similarly, $^{213}$Bi-d9MAB is therapeutically effective and exhibits low bone marrow toxicity when used for locoregional therapy in patients who express d9-E-cadherin and suffer from gastric carcinoma (HUBER, R., SEIDL, C., SCHMID, E, SEIDENSCHWANG, S., BECKER; K.-F., SCHUMACHER; C., APOSTOLIDIS, C., NIKULA, T., KREMMER, E., SCHWAIGER, M. and SENEKOWITSCH-SCHMIDTKE, R. (2003): Clinical Cancer Research (Suppl.) 9, 1s-6s: "Locoregional α-Radioimmunotherapy of Intraperitoneal Tumor Cell Dissemination Using a Tumor-specific Monoclonal Antibody"). Also see: Roswitha HUBER, doctorate dissertation in the Faculty of Veterinary Medicine submitted to the Ludwig-Maximilians-University of Munich, Jul. 18, 2003: "Bewertung der lokoregionalen Radioimmuntherapie disseminierter Tumorzellen des diffusen Magenkarzinoms mit einem $^{213}$Bi gekoppelten tumorspezifischen Antikörper im Mausmodell" (Evaluation of a locoregional radioimmunotherapy of disseminated tumor cells of the diffuse gastric carcinoma with a $^{213}$Bi bound tumor specific antibody in the mouse model).

As described herein, the preparation of a suitable α-emitter, namely $^{225}$Ac which forms through a decay reaction when bound, for example, to a tumor specific antibody, can be useful for the treatment of acute or chronic myelogenous leukemia.

The $^{213}$Bi atom decays via β-decay to $^{213}$Po, which releases its α-decay energy of 8.4 MeV with a half life of 4 μs in the tissue within a distance of 80 μm when decaying and thus kills effectively cells in its immediate neighborhood due to its high linear energy transfer.

The locoregional application enables a quick binding of $^{213}$Bi bound tumor specific antibody to the tumor antigens with maximal therapeutic success and minimal toxicity.

One of the few α-emitters which fulfill the relevant therapeutic criteria is the nuclide pair $^{213}$Bi/$^{213}$Po with a half-life of 45.6 min ($^{213}$Bi). The photon emission of $^{213}$Bi with 440 KeV additionally permits an in vivo scintiscanning of the patient.

Accelerated proton irradiation of $^{226}$Ra can be used to produce $^{225}$Ac. Protons can be accelerated on spiral shaped orbits in magnetic flux lines in a cyclotron with currents that are high enough, and to such high velocities, that they can be used in experimental and applied nuclear physics for the production of isotopes in a quantitative scale.

For example, EP 0 752 709 B1 describes a method for producing actinium-225 from Radium-226 wherein accelerated protons are projected in a cyclotron onto a target of radium-226 so that the instable compound nucleus $^{227}$Ac is transformed into actinium-225 upon emitting two neutrons (p,2n-reaction). This process occurs after a waiting period during which the actinium-226 (which has been created simultaneously due to the emission of only one neutron) decays (mostly due to its considerably shorter half-life). The actinium is then chemically separated so that a relatively pure isotope Ac-225 is obtained.

The $^{226}$Ra target used according to the procedure of EP 0 752 709 B1 is not specified in detail there. EP 0 962 942 A1 also describes a method for producing Ac-225 by irradiation of $^{226}$Ra with cyclotron accelerated protons having an energy of 10 to 20 MeV.

Although it is already possible to achieve good actinium-225-yields with the targets according to EP 0 962 942 A1, it has turned out in practice that this target construction can heat itself under certain conditions due to the proton beam in such a way that the silver capsule tears open and might thus both destroy the target and contaminate the peripheral compounds.

In order to solve these target problems, two different improved radium targets for the production of radionuclides by means of accelerated protons have been devised. In one target preparation, a method of electrodeposition of $^{226}$Ra-material is disclosed in DE 103 47 459 B3. The other one, an evaporation-dispensing system, is disclosed in DE 10 2004 022 200 A1. Both application papers are herewith incorporated by reference in their entirety. These methods of target preparation provide the finally desired $^{225}$Ac-product on an Aluminum surface, and in a mixture of different radionuclides.

Nevertheless, the final product contains unconverted $^{226}$Ra and other Ra isotopes. In addition, different decay products of actinium occur as well as nuclear conversions of contaminating elements such as Al.

Impurities in the Al mesh measured by $k_o$-Based Neutron Activation Analysis ($k_o$INAA) are given in Table 1:

TABLE 1

| Element | Content [μg/g] |
| --- | --- |
| Fe | 1302 |
| Cr | 701 |
| Ni | 0.2 |
| Ga | 145 |
| Zn | 39 |
| Na | 9 |
| Mo | 3.5 |
| U | 1.3 |
| Co | 2.0 |
| Ce | 1.8 |
| La | 0.69 |
| W | 0.2 |
| Sb | 0.07 |

TABLE 1-continued

| Element | Content [µg/g] |
|---|---|
| Th | 0.18 |
| Br | 0.11 |
| Sm | 0.08 |
| As | 0.06 |
| Sc | 0.02 |
| Au | 0.002 |

It is important to minimize the content of Sr and Ba, which lead to the production of radioisotopes of Y and La, respectively.

The main chemical impurities in the radium available from radioactive ampoules used in the experiments (claimed as secondary standards) is given in Table 2.

TABLE 2

| ELEMENT | $mg_I/mg_{Ra}$* |
|---|---|
| Ba | 0.63 |
| Ca | 0.59 |
| Na | 0.46 |
| Zn | 0.08 |

*$mg_I/mg_{Ra}$ - mg impurity per mg radium

Several radioisotopes are produced as a result of nuclear reactions type (p,n) or (p,2n) on impurities like Ba, Ca, Fe, Zn, Sr, Pt, V, Ti, Cr, Mg, Mn, Na and Cu which can be present in the Al carrier (foil, mesh) and/or in the Ra deposit. The radionuclides of major contribution to the total gamma activity excluding $^{226}$Ra and daughters are typically the following: $^{55}$Co, $^{56}$Co, $^{67}$Ga, $^{57}$Ni, $^{51}$Cr, $^{48}$V, $^{52}$Mn, $^{54}$Mn, $^{65}$Zn.

In addition, disturbing radiochemical impurities are $^{210}$Po and $^{210}$Pb resulting from the following decay chain: Ra-226 (alpha)→Rn-222(alpha)→Po-218 (alpha)→Pb-214 (beta)→ Bi-214 (beta)→Po-214 (alpha)→Pb-210 (beta)→Bi-210 (beta)→Po-210 (alpha) Pb-206 (stable).

To summarize, despite the already optimized target systems as provided by DE 103 47 459 B3 and DE 10 2004 022 200 A1, the final $^{225}$Ac-product still contains significant amounts of inorganic, radionuclidic and organochemical impurities, which render the obtained $^{225}$AC product unsuitable for direct medical or pharmaceutical application. A purification of the $^{225}$Ac product is suggested in the not prepublished German patent application DE 10 2006 008 023.8-43 filed on 21 Feb. 2006, and having the title "Method for Purification of $^{225}$AC from Irradiated $^{226}$Ra-Targets".

Moreover starting from pure radium as raw material, the contaminations in the produced actinium can be significantly reduced.

The general aspects of the radioanalytical separation of radium were formerly summarized by KIRBY H. W. and SALUTSKY M. L (1964) "The radiochemistry of radium", NAS-NS-3057.

Procedures for the separation of radium include, Mme. CURIE's classical method based on co-precipitation (with barium sulphate) for isolating radium from pitchblende and fractional crystallization for separating radium from its chemical homologue barium (CURIE M.-Nobel Lecture 1911, Stockholm). The same procedure was used to revise the atomic mass of radium by HÖNIGSCHMID O. (1911) Mitteilungen aus dem Institute für Radiumforschung—"Revision des Atomgewichtes des Radiums und Herstellung von Radiumstandardpräparaten" and HONIGSCHMID O. and SACHTLEBEN R. (1934),—Z. anorg. u. allg. Chem, Bd. 221, S. 65-82 supported by GERLACH W. and RIEDL E. (1934),—Z. anorg. u. allg. Chem, Bd 221, S. 103-108. The precipitation method can also be used with concentrated nitric acid. The disadvantage of this method is due to the difficulty in handling fumic nitric acid. Other precipitation agents, for example oxalate, carbonate or chromate have also been used (SALUTSKY M. L. and STITES J. G (1955),— Ind. Eng. Chem., Vol. 47 No. 10, pp. 2162-2166).

Even though these classical methods allow the isolation of high quantities of radium, they have the disadvantage that the complete isolation of radium is only possible after several repetitions of the mentioned procedure. For example, is well known that Mme Curie isolated the radium after hundred and more fractional crystallization steps.

Other, more efficient, chemical methods are now available for the separation/concentration of small amounts of radium. These methods include, but are not limited to chromatography, ion exchange, organic extraction or extraction chromatography.

The use of one of these modern methods for separation/purification of radium is described in several scientific works like those of TOMPKINS E. R. (1948),—J. Am Chem. Soc. Vol 70, No. 10, pp. 3520-3522, POWER W. H. et al. (1959),— Anal. Chem. Vol. 31, No 6, 1077-1079, NELSON F. (1964),—J. Chromat. 16, pp. 403, CHIARIZIA R. et al. (1995), Solv Extr. Ion. Exch. 13 (6) 1063-1082, WLODZIMIRSKA B., BARTOS B., BILEWITZ A. (2003),—Radiochim. Acta 91, 9, MOON D. S., BURNETT B. (2003),— Appl. Rad. Isot 59, pp. 288, HAGERMANN F. (1950),—J. Am Chem, Soc. 72 p 768, BURNETT W., CABLE P. (1995),—Radioactivity and Radiochemistry Vol. 6, No. 3, pp 36-44 etc.

Due to its chemical properties, one of the frequently used methods for radium purification from the above mentioned ones is the cation exchange chromatography.

The difficulty of the radium purification procedure based on cation exchange is due to the limitations of the eluting agents. Usually this method implies the use of complexing agents to facilitate the separation and increase the decontamination factors. In VDOVENKO V. M. and DUBASOV Y. U. (1973), "Analytical chemistry of radium", John Wiley & Sons, GLEASON G. (1980), "An improved ion exchange procedure for the separation of barium from radium", Ann. Arbor Science Publishers Inc. pp. 47-50 and SAMUELSON O. (1963), "Ion exchange separations in analytical chemistry", John Wiley & Sons as well as TOMPKINS E. R. (1951), U.S. Pat. No. 554,649 this type of purification with complexing agents is well detailed.

The main difference between the enumerated classical and modern separation techniques is the amount of radium used for testing. The classical methods were successfully applied on high amounts of radium while the modern methods were generally tested for trace or low level radium contents.

The methods described herein, the final form of the radium (up to about 100 mg) used for target preparation can be in an acidic solution in $HNO_3$ and free from any complexing agent. Thus, the purification step described herein is based on cation exchange and does not require use of such complexing agents.

This method of the purification of radium is based on the retention of radium on a special cation exchange resin and elution of possible contaminants. Such resins have been shown to be useful for other purposes (van der WALT T. N. and STRELOW F. W. E. (1983), Anal. Chem. Vol. 55, pp. 212-216 as well as in STRELOW F. W. E. (1985),—Anal. Chem. Vol. 57, pp. 2268-2271).

In the present invention this step was successfully tested to purify radium up to several milliCuries, while the extraction chromatographic method was applied up to hundreds of micrograms of radium.

In one aspect, the methods described herein relate to the problem radium impurities and can be used to isolate radium, for example $^{226}$Ra, at a purity suitable for cyclotron target preparation for $^{225}$Ac production from radioactive sources.

Figure 7:
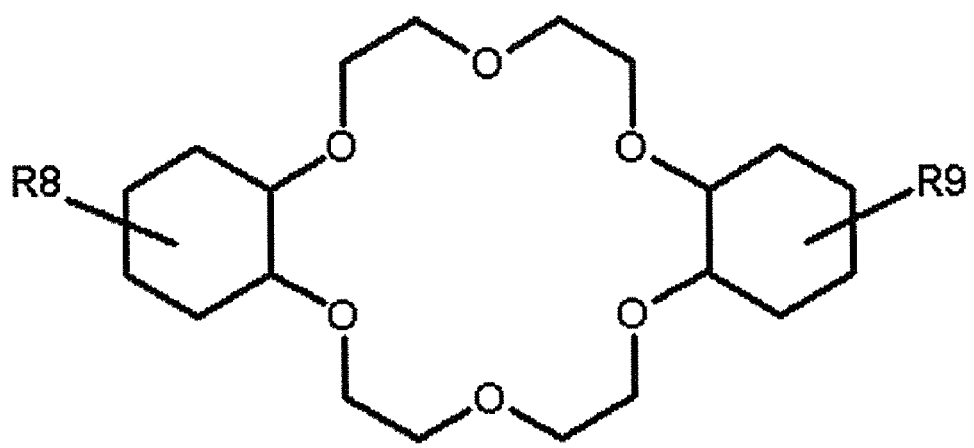
FIG. 7. Formula I.
Figure 8:
FIG. 8. Formula II.

This problem is solved by a method for the purification of radium, in particular $^{226}$Ra, for target preparation, particularly cyclotron target preparation, for $^{225}$Ac production from available radioactive sources, comprising the following steps: a) detecting the quality of the Ra material to be purified; b) leaching out Ra with a mineral acid from its storage vessel at least one time; c) carrying out at least one extraction chromatography in order to separate chemically similar elements such as Ba and Sr from the desired Ra; d) wherein said extraction chromatography in step c) is carried out on a solid support material having an extractant system coated thereon, comprising at least one compound in accordance with general formula I (FIG. 7) in at least one compound in accordance with general formula II (FIG. 8), wherein in formula I:
R8 and R9 independently is H, $C_1$-$C_6$ alkyl, or t-butyl; and
wherein in formula II:
R10 is $C_4$ to $C_{12}$ alkyl; and wherein $HNO_3$ or HCl is used as mobile phase;

e) recovering Ra from the early fractions, whereas Ba and Sr are contained in fractions with higher retention time and the Pb is retained on the extractant system; f) pooling Ra fractions; and g) concentrating the purified Ra-containing fractions.

According to the present invention, the Pb is retained on the extractant and can be removed using high concentrated HCl or complexing agents such as EDTA.

In one embodiment, $HNO_3$ is used to accomplish step (b). In one embodiment, the concentration of $HNO_3$ used in this step is 0.1M. In another embodiment, $HNO_3$ or HCl is used as said mobile phase of step (d) in a concentration range of 0.1 M to 4 M. In another embodiment, $HNO_3$ or HCl is used as said mobile phase of step (d) at a concentration of 1M.

An appropriate tool for concentration of Ra-containing starting or stock solutions is a rotary evaporator.

Dried or highly concentrated residues can be redissolved in a minimum volume of a mineral acid. In one embodiment, the mineral acid can be $HNO_3$. In another embodiment, the mineral acid can be 0.1 M $HNO_3$.

Figure 9:
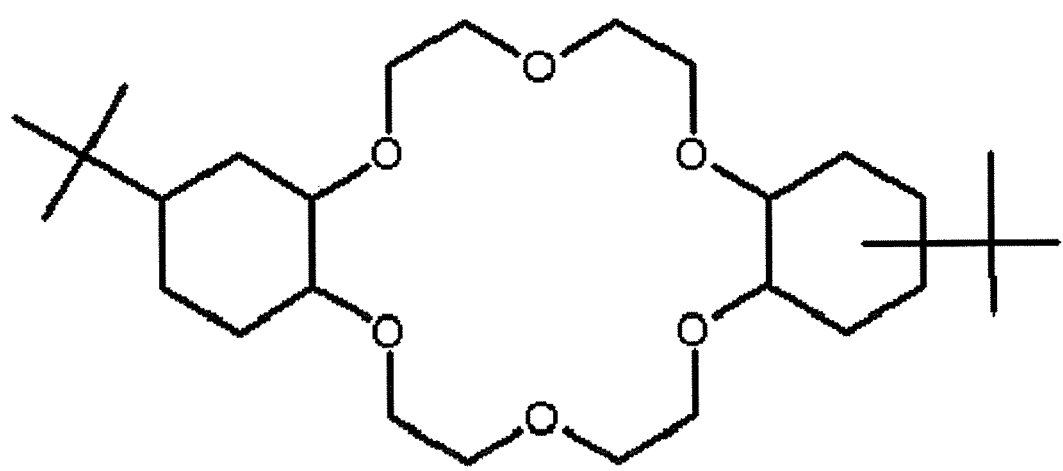
FIG. 9. Formula III.

In a preferred embodiment of the present invention, the natural decay product $^{222}$Rn is removed from the Ra material during an evaporation step. Such an evaporation step can be, for example, evaporation within a rotary evaporator. Activated carbon traps can be used as a Rn retaining medium In practice, a method using an extractant system having a crown ether in accordance with formula III (FIG. 9) in octanol is also suitable with the methods described herein.

In one embodiment, the extractant system is 4,4'-bis(t-butylcyclohexano)-18-crown-6 in 1-octanol.

In another embodiment, the extractant system is 4,5'-bis(t-butylcyclohexano)-18-crown-6 in 1-octanol.

In another embodiment, commercially available resin such as "Sr Resin" made by EICHROM, can be used where the extractant in the stationary phase is a crown ether: 4, 4'(5')-bis(t-butylcyclohexano)-18-crown-6 in 1-octanol.

Typically, the detection of the quality of the Ra material can be performed by γ-spectrometry, in particular in situ γ-spectrometry, and by Inductively Coupled Plasma Optical Emission Spectroscopy (ICP-OES).

Purified Ra-fractions of the extraction chromatography can be concentrated by evaporation to dryness, for example with a spiral-line heater or a silicon heater.

It is a further object of the present invention to provide an effective method for recycling of $^{226}$Ra, for cyclotron target preparation for $^{225}$AC production from radium targets irradiated with accelerated protons (p,2n), after separation of the produced $^{225}$Ac.

This problem is solved by a method comprising the following steps:

a) detecting the quality of a Ra-containing solution to be purified being provided in a mineral acid solution; b) concentrating the Ra-containing solution by evaporation; c) removing trace amounts of organic compounds by means of a prefilter column wherein said prefilter column is an inert solid support material; d) carrying out at least one cation exchange chromatography in order to separate the Ra from the main chemical contaminants, wherein said cation exchange chromatography in step d) is carried out on an acidic cation exchanger, and preferably on an acidic macroporous type cation exchanger; e) washing the cation exchange resin with low molar mineral acid to remove the main chemical contaminants; f) eluting Ra from the cation exchange resin with high molar mineral acid wherein such fractions still contain chemically similar elements such as Ba and Sr; g) pooling and concentrating the partially purified Ra fractions; h) subjecting the partially purified Ra-containing fractions to at least one extraction chromatography, wherein said extraction chromatography step is carried out on a solid support material having an extractant system coated thereon, comprising at least one compound in accordance with general formula I in at least one compound in accordance with general formula II, wherein in formula I: R8 and R9 independently is H, $C_1$-$C_6$ alkyl, or t-butyl; and wherein in formula II: R10 is $C_4$ to $C_{12}$ alkyl; and wherein $HNO_3$ or HCl is used as mobile phase;

i) recovering Ra from the early fractions, whereas Ba and Sr are contained in fractions with higher retention time; j) pooling Ra fractions; and k) concentrating the purified Ra-containing fractions.

In a method according to the present invention, the Ra in step (a) of the Ra recycling can be provided in HCl or $HNO_3$. In one embodiment, the $HNO_3$ can be within a concentration range of 0.1M to 4M. In another embodiment, HCl can be within a concentration range of 0.1 to 4M. In another embodiment, $HNO_3$ or HCl can be used as the mobile phase in step (h). In one embodiment, the $HNO_3$ or HCl can be used in a concentration range of 0.1M to 4M. In another embodiment, the $HNO_3$ or HCl can be used at a concentration of 1M.

In one embodiment, the main chemical contaminants are selected from the group consisting of Ag, Al, As, Be, Bi, Ca, Cd, Co, Cr, Cu, Fe, Ga, K, Li, Mg, Mn, Na, Ni, Pb, Sr, V, Zn, as well as mixtures thereof.

In one embodiment, the concentration steps can be performed by evaporation, for example, in a rotary evaporator, a spiral-line heater or a silicon heater.

In one embodiment, the decay product $^{222}$Rn can be removed from the $^{226}$Ra material during an evaporation step using activated carbon traps.

A high molar mineral acid can be used to elute the Ra from the used cation exchange resin. In one embodiment, the high molar mineral acid can have a concentration range of 2M to 10M. In another embodiment, the high molar mineral acid can have a concentration range of 3M to 8M. In another embodiment, the high molar mineral acid can have a concentration of about 4 M. In one embodiment, the mineral acid can be $HNO_3$.

Figure 10:
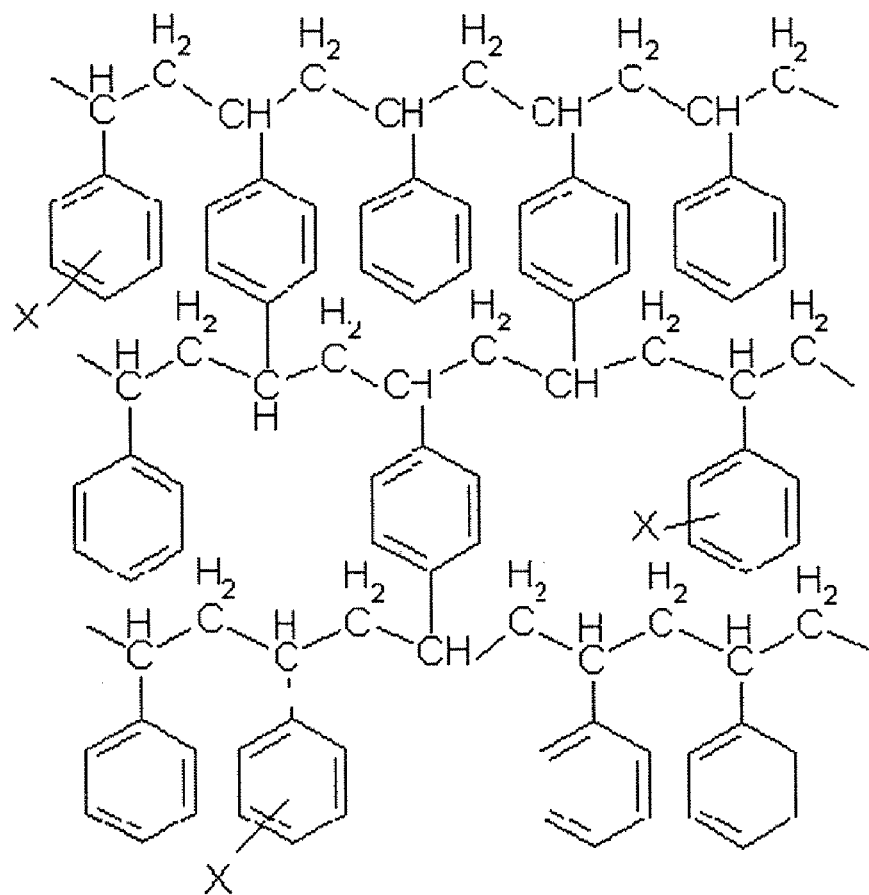
FIG. 10. Formula of a cation exchanger.

Suitable cation exchange materials can be selected on the basis of a cation exchanger being an acidic cation exchange resin in accordance with the following formula shown in FIG. 10. In another embodiment, the cation exchanger can be an acidic macroporous type cation exchanger (FIG. 10).

Commercially available resins, such as AG-MP50" resin from Bio-Rad Laboratories, Inc. can be used for the cation exchange step.

In one embodiment, an extractant system in form of a crown ether in accordance with formula III in octanol can be used for further purification during Ra recycling.

In one embodiment, the extractant system can be 4,4'-bis(t-butylcyclohexano)-18-crown-6 in 1-octanol. In another embodiment, the extractant system can be 4,5'-bis(t-butylcyclohexano)-18-crown-6 in 1-octanol.

In one embodiment, the solid support in feature (h) can be selected from the group consisting of: porous silica and inert organic polymers. In one embodiment, the solid support in feature (h) is an acrylic ester non-ionic polymer.

For the irradiation of radium compounds completely capsulated in a metallic target cup sufficient amounts of radium have to be available with adequate quality. The procedure regarding the target preparation per se is described in WO 2005/105160, WO 2005/039647, and EP1673492. To cover the needs of radium, two sources of radium were used: (1) from existing (available) radioactive sources and (2) from recycling after irradiation of radium at the cyclotron and its subsequent separation from actinium.

The procedure of the present invention describes a method for preparing and/or purifying radium either from existing radioactive sources or from irradiated recycled radium. In one embodiment, the purified radium has to be of sufficient quality to allow its subsequent irradiation.

The radiochemical procedures which are proposed for the present application comprises the following: i. Preparation of $^{226}$Ra from existing radioactive sources for target preparation; ii. Separation of the irradiated radium from the target support material (aluminium) and from most of the activation products by cation exchange chromatography; iii. Purification of Ra from other impurities which can interfere with the quality of the final product $^{225}$Ac: like Ba or Sr, using extraction chromatography; iv. Quality control of the prepared/purified Ra fraction.

The invention refers to a procedure for the purification of $^{226}$Ra in order to prepare radium targets for cyclotron irradiation. It comprises the following steps:

Purification/recycling of Ra-226
from available radioactive sources
from irradiated radium targets;
Implementation of the separation/purification procedure for high activity samples.
Quality control of the prepared/purified radium.

In one embodiment, the radiochemical process can be completely automated to minimize the manual handling of highly radiotoxic radium. In another embodiment, the radiochemical process can be partially automated to minimize the manual handling of highly radiotoxic radium.

In one embodiment, the purification of the radium can be performed such that good recovery and high decontamination factors for the main contaminants for obtained. The purification procedure has to cover the separation of Ra from the aluminium as target support material, from the main contaminants resulting from activation and from contaminants which can influence the quality of the actinium (like Ba or Sr).

Further advantages and features are given by describing examples as well as the accompanying drawings.

For the purpose of producing $^{225}$Ac via p,2n reaction with accelerated protons, the radium as target material has to correspond to very high purity; otherwise the amount of the obtained activation products among the produced actinium will increase dramatically after irradiation. Therefore, one of the primary goals in the present invention is to provide radium as pure as possible for radium targets preparation in order to minimize the quantity of possible contaminants/impurities.

To obtain radium with very high purity level there are two possibilities which will be illustrated in the Examples below:

It will be readily apparent to those skilled in the relevant arts that other suitable modifications and adaptations to the methods and applications described herein can be made without departing from the scope of the invention or any embodiment thereof.

The following examples illustrate the invention described herein, and are set forth to aid in the understanding of the invention, and should not be construed to limit in any way the scope of the invention as defined in the claims which follow thereafter.

The following methods can be used in connection with the embodiments of the invention.

EXAMPLES

Example 1

Procedure for the Preparation of $^{226}$Ra from Available Radioactive Sources

Figure 2:
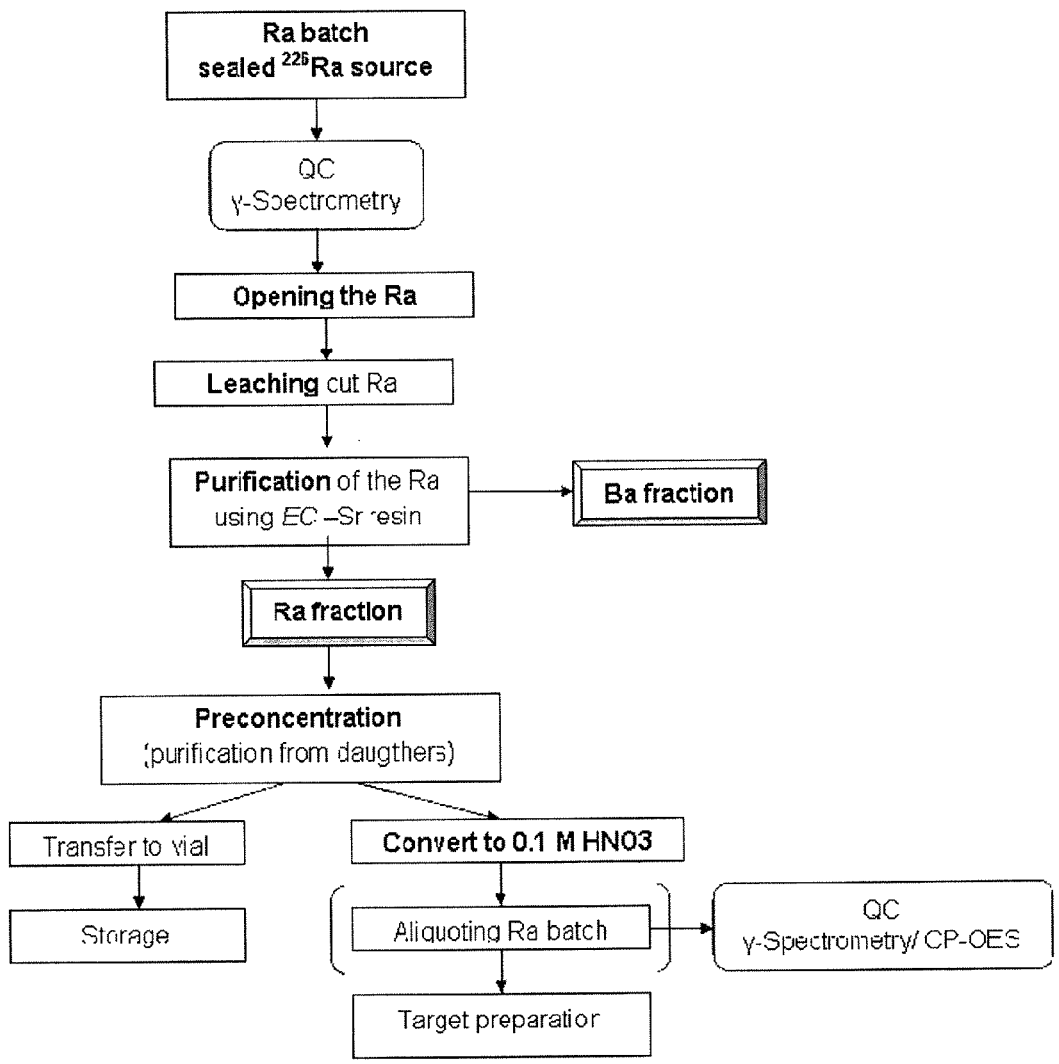
FIG. 2. A preparation/purification scheme for $^{226}$Ra from available radioactive sources in accordance with the invention and shown as a flow chart of the separation of Ra from the main activation products.

The general scheme of the radium preparation procedure from available radioactive sources in accordance to the present invention is shown in FIG. 2.

The commercially available radium sources at Curie or milliCurie level have various degrees of chemical and radionuclidic purity. The better the purity of the initial material is, the simpler the preparation/purification procedure. The quality management (QM) consists in an initial check of the radium purity and activity. Therefore, after the receipt of the radioactive material, a first quality control (QC) measurement is made, based on gamma spectrometry which allows an estimate of the total activity of radium and the main radionuclidic impurities. Working with mCi or higher levels of Ra the fastest way to check the activity given in the specification is by in-situ gamma-spectrometric measurements.

After the estimation of the activities of $^{226}$Ra and the main radioisotopic impurities-if any—the samples are opened in a hermetically closed shielded glove-box. As for many of the radioactive sources, one of the common approaches to transport/store them is in dry form in closed glass ampoules. The radium sources closed in glass ampoules are opened and the radioactive material is leached out quantitatively from such ampoules. The opening of the ampoules is done using two different approaches: (1) by crashing the ampoules or (2) by cutting and pouring out the dry radioactive material in order to leach the dried radium salt with diluted $HNO_3$ (GDCh conf: Kabai et al., 2005). Similar approaches were applied for analysis of I-129 or Tc-99 by Kabai et al. (2003) and for determination of Lu-177 impurities by Pawlak et al (2004) aiming to open ampoules with radioactive materials and wash out the radioactive component.

After the radium is leached out from an ampoule and dissolved in a minimum volume of 0.1 M $HNO_3$, it is concentrated by evaporation in a rotary-evaporator and converted to the nitrate form. For closed radium sources the formed $^{222}$Rn is in equilibrium with the mother nuclide $^{226}$Ra. The presence of radon along with radium has to be avoided as much as possible because it is the main contributor to the effective dose which has to be minimized. Therefore, the evaporation step is also used for removing the formed radon.

Hereby, the evaporation of the radium is carried out in a safe closed system. Before release, the evacuated air is passed through two consecutive charcoal traps in order to retain the radon inside the glove-box, minimizing the amount of radon released.

In order to control the chemical purity of the radium, a small aliquot is taken from the solution sent to the rotary-evaporator.

This aliquot is diluted further and a quality control sample is analysed by spectrometric methods. The Inductively Coupled Plasma Optical Emission Spectroscopy (ICP-OES) method was found to be suitable for this analysis having enough sensitivity for all the chemical contaminants expected in the radium solution.

The sample is concentrated close to dryness and it is re-dissolved in a few milliliters of 0.1 M $HNO_3$. Then the solution is transferred to a V-vial by using high purity argon. The last step it is repeated two-three times in order to wash out all the radium from the flask of the rotary-evaporator. The shielded V-vial containing the radium solution is evaporated to dryness using a spiral-line heater or a silicon heater. The V-Vial is closed with a phenolic cap, placed in a lead container and the activity of radium is estimated based on the second in-situ gamma-measurement. The so quantified radium in the thick wall V-vial is used for cyclotron target preparation or else sent to storage.

For the target preparation the V-Vial with the desired activity is opened again, and the radium salt dissolved in 0.1 M $HNO_3$.

After complete homogenisation the solution is transferred to a dispenser. The dosage of the radium solution for target preparation is controlled through the dispenser. The V-vial is washed two times with a few mL of 0.1 M $HNO_3$ in order to minimize the losses on the wall of the vial.

Table 2 shows the typical ratios of impurities to radium obtained from radium ampoules. The main inactive impurities are Na, Ca, Ba and Zn while the radioisotopic purity is very high, usually more than 99%. Only different activities of radium daughters could be measured in the gamma-spectra, depending on the time elapsed since the last radon evacuation.

If the radium had worse quality parameters, one-step purification would be applied based on Sr resin aiming to remove especially the barium present near the radium. In this case the radium is loaded in 1 M $HNO_3$ on a small Sr resin column (bedvolume-BV~2 mL) before complete drying in V-Vial. The radium is collected in BV 1-4 then the barium has higher retention times and it occurs in the BV 5-10. The Sr will be retained on the column.

Figure 3:
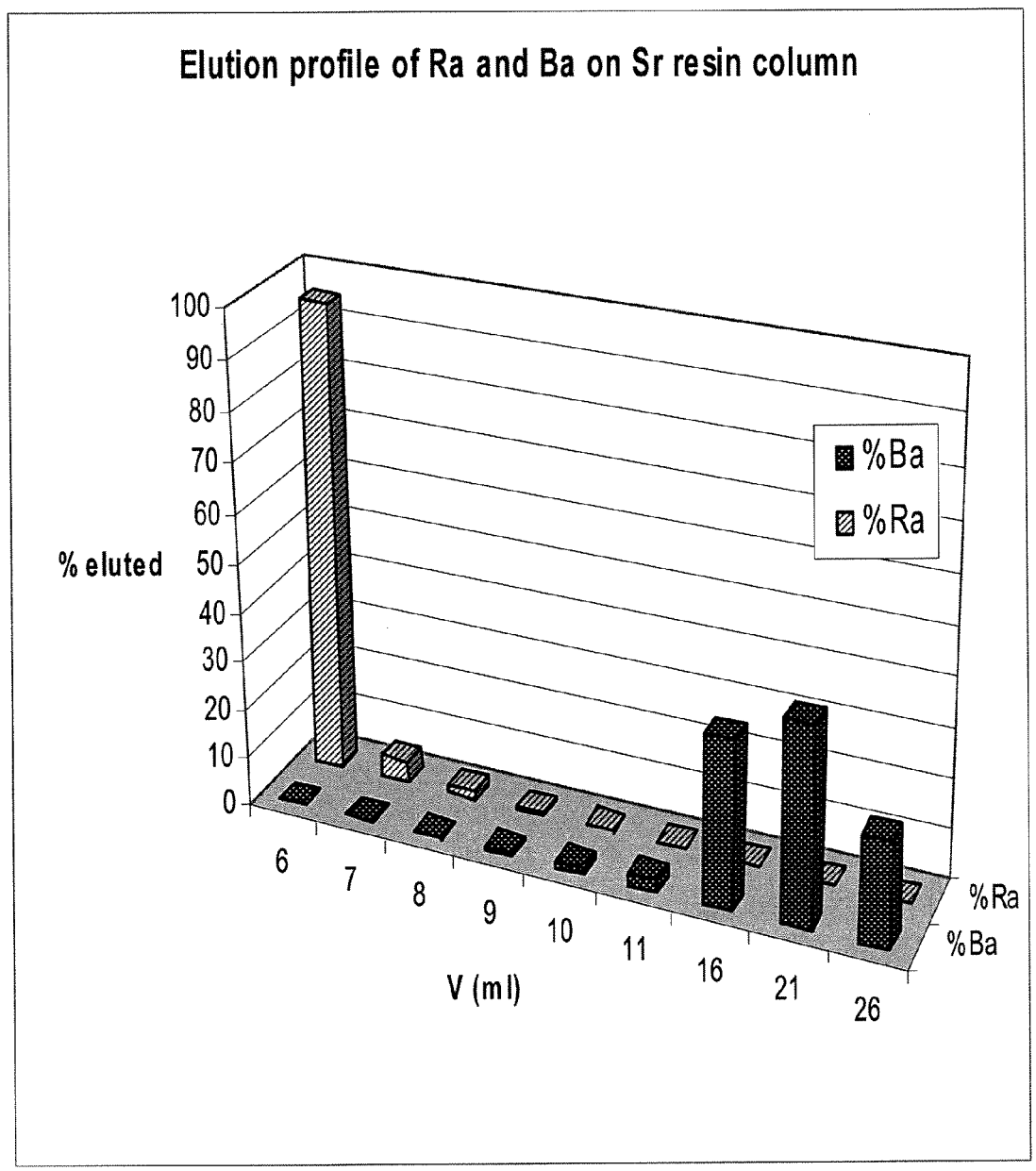
FIG. 3. An elution profile of Ra and Ba on an Sr resin column from 1 M $HNO_3$, 3.5×0.8 cm, BV~2 mL.

The elution profile of Ra and Ba on Sr resin column from 1 M $HNO_3$, 3.5×0.8 cm, BV~2 mL is shown in FIG. 3.

This purification step was successfully applied for radium amounts up to levels of several hundred micrograms.

Example 2

Procedure for Recycling of $^{226}Ra$ from Irradiated Radium Targets

Figure 4:
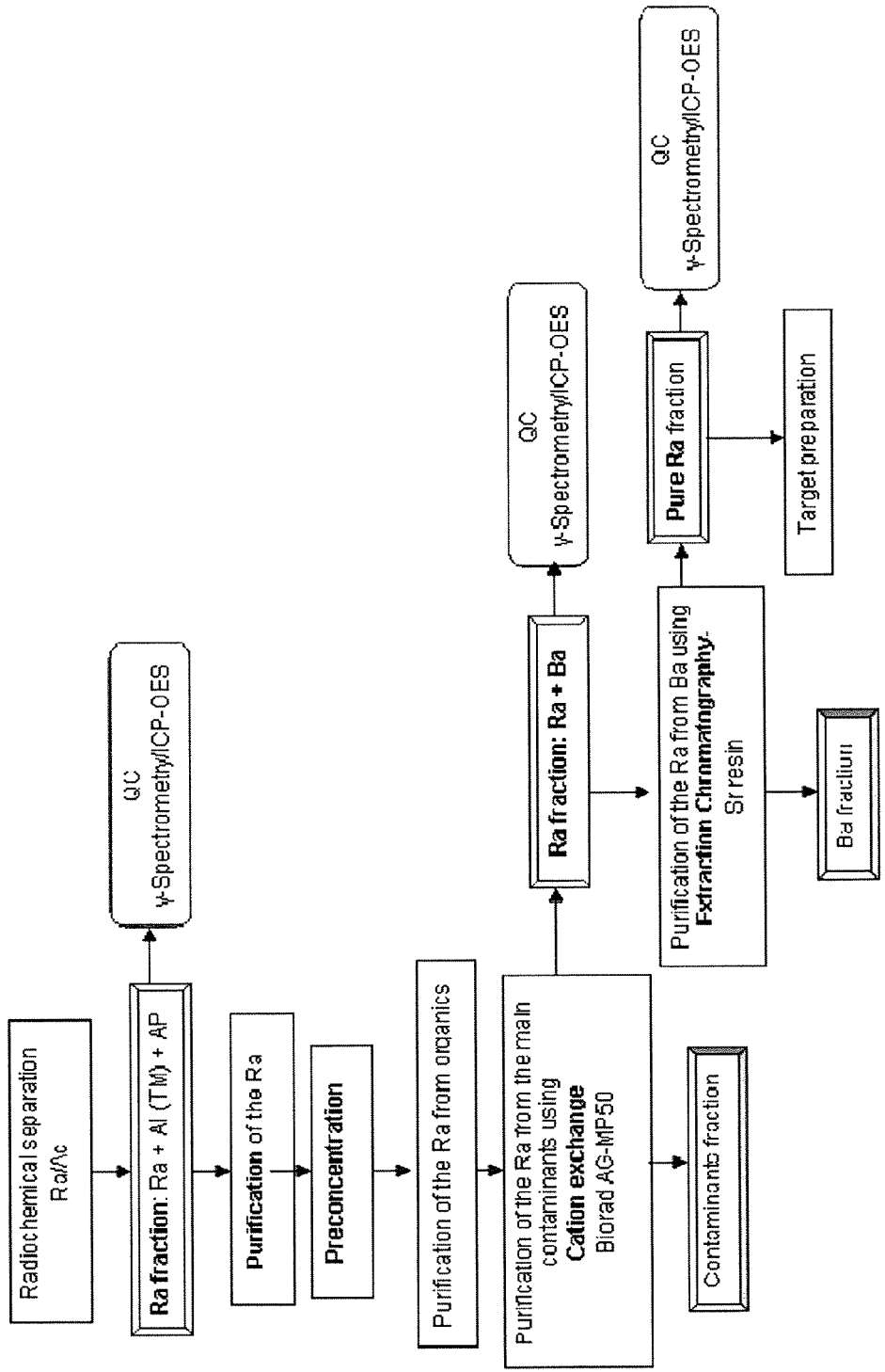
FIG. 4. Recycling of radium from irradiated radium targets in schematic view.

Another method for obtaining pure radium is by recycling the radium that is already being irradiated with accelerated protons for $^{225}Ac$ production. This approach is more complicated than the previous due to the fact that the irradiated radium has a much lower grade of purity than the original material. The general scheme of the applied radium recycling procedure is shown in FIG. 4.

The procedure is based on the chemical and radioisotopic composition of the radium fraction after the separation from actinium. The main chemical and radioisotopic contaminants present in the radium fraction after irradiation and separation from actinium are summarized in the Table 3. This table shows the ratios of the corresponding element to the radium (also see—DE 10 2006 008 023.8).

TABLE 3

Main chemical contaminants typically present in the irradiated radium fraction after the separation from actinium before recycling (mass ratios relative to the radium)

| Element | mg Contam/mg Ra |
|---------|-----------------|
| Ag | 0.06 |
| Al | 172.2 |
| As | 0.15 |
| Ba | 0.81 |
| Be | 0.06 |
| Bi | 0.13 |
| Ca | 0.94 |
| Cd | 0.04 |
| Co | 0.42 |
| Cr | 0.15 |
| Cu | 0.57 |
| Fe | 0.80 |
| Ga | — |
| In | — |
| K | 3.01 |
| Li | 0.02 |
| Mg | 7.69 |
| Mn | 1.16 |
| Na | 3.27 |
| Ni | 3.20 |
| Pb | — |
| Rb | — |
| Se | |
| Sr | 0.09 |
| Tl | — |
| U | — |
| V | — |
| Zn | 1.79 |

Starting from this composition and from the radioisotopic impurities present in the radium fraction, the objective of the present invention regarding the recycling is to provide a combined procedure based on a multi-step purification scheme which allows the separation of the radium from the contaminants according to Table 3. The proposed procedure is based upon a cation exchange combined with extraction chromatography.

In one embodiment, the final form of the radium used for target preparation is an acidic solution in $HNO_3$, free from any complexing agent. Thus, in one embodiment, the proposed purification step based on cation exchange omits any use of such complexing agents.

After the separation of $^{225}Ac$ from irradiated radium, the radium fraction, in 2 M $HNO_3$, is evaporated in order to concentrate it. Then the concentrated radium solution, which can contain some organic contaminants, is then passed through a prefilter column (an inert solid support material) to remove trace amounts of organic compounds. The cation exchange step performed immediately after the prefilter column, allows for the separation of the radium from the main chemical contaminants, like aluminium as target support material, Mg, Co, Ni, Zn and Fe. For this the original solution is first converted to 0.1 M HCl. The solution is then passed through a Biorad AG-MP50 cation exchange resin. The resin is an acidic macroporous type cation exchange resin with high effective surface having approximately 35% porosity and a nominal capacity of 1.5 meq/mL. This resin has higher retention properties than a normal cation exchange resin. These properties enable the resin to retain radium up to several mCi-s on a 5-6 mL bed volume column from 0.1 M HCl media. The column is then intensively washed with HCl having different molarities, in order to elute any possible contaminant retained on the column. Finally, the strongly retained radium is eluted with approximately 150 mL 4 M $HNO_3$ solution.

The results show that under these experimental conditions the recovery of the radium is higher than 90%. The obtained decontamination factor for Al is $10^3$. The obtained decontamination factor for transitional metals is $10^2$. In order to increase the decontamination factors of the contaminants relative to the radium, a second column identical with the previous can be introduced in the procedure. In this way it is possible to obtain high decontamination factors for all the transition metals. After the radium is eluted from the second column in 4 M $HNO_3$, it is evaporated until is a wet residue and is then re-dissolved in 1 M $HNO_3$. Next, the radium in 1 M $HNO_3$ is used as feeding solution for an extraction chromatographic column filled with Sr resin (EICHROM). This resin allows the separation of the radium from barium and trace amount of strontium still present in the radium fraction.

Ba is chemically similar to the radium and is difficult to separate from radium on a cation exchange resin. Extraction chromatography enables separation radium from the barium usually present near the radium in the samples. Extraction chromatography also allows separation of any strontium detected among radium. The separation on Sr resin was conducted with radium-barium mixtures up to several hundred micrograms.

The chemical composition obtained after the recycling process using two cation exchange columns and one Sr resin column is shown in Table 4. These results show that the chemical purity of the radium was substantially improved during the multi-step procedure and it is comparable with that of the original, non irradiated radium.

TABLE 4

Main chemical contaminants typically present in the irradiated radium fraction after the separation from actinium and recycling (mass ratios relative to the radium)

| Element | mg Contam/ mg Ra |
|---|---|
| Ag | 0.06 |
| Al | 0.15 |
| As | — |
| Ba | 0.04 |
| Be | 0.02 |
| Bi | — |
| Ca | 0.63 |
| Cd | 0.02 |
| Co | 0.01 |
| Cr | 0.04 |
| Cu | 0.03 |
| Fe | 0.06 |
| Ga | — |
| In | — |
| K | — |
| Li | — |
| Mg | 0.03 |
| Mn | 0.01 |
| Na | 4.43 |
| Ni | 0.03 |

TABLE 4-continued

Main chemical contaminants typically present in the irradiated radium fraction after the separation from actinium and recycling (mass ratios relative to the radium)

| Element | mg Contam/ mg Ra |
|---|---|
| Pb | — |
| Rb | — |
| Se | — |
| Sr | 0.02 |
| Tl | — |
| U | — |
| V | — |
| Zn | 0.06 |

Although the quality of the radium can be further improved by including more steps in the process, the inclusion of more steps in the process can cause the recovery of the radium to decrease. To avoid this problem, the radiochemical procedure described herein will be tested for the separation of several milligrams of radium.

Example 3

Implementation of the Separation/Purification Procedure for High Activity Samples To obtain the required amount of $^{225}Ac$, hundreds of milligrams of radium can be involved in the process. Working with the highly radiotoxic radium at hundred milligrams level is possible only with careful planning of the radiochemical processes. In order to minimize the exposure of the personnel, all the involved radiochemical processes can be automated.

The automation of the radiochemical processes is can be achieved by taking into account the schemes and details described herein.

The implementation of the automation process is done based on the collaboration of the Institute of Radiochemistry with the Institute for Machine Tools and Industrial Management (iwb), both of the Technical University of Munich. In this respect, continuous work is put into the automation plans of the radium preparation and recycling, respectively.

Example 4

Quality Control (QC) of the Purified/Recycled Radium

The quality management of the product (actinium) and the raw material (radium) is important. The quality of the starting material will influence not only the quality and the yield of produced actinium, but will define the radiochemical procedure applied for the recycling of the irradiated radium. Therefore, additional effort was put in the quality control (QC) of the radium used as starting material as well as for the purification/recycling process. QC was used at the beginning of the process to extend the characterization/prove the quality of the radium sources given in the official specification. Later on the quality control was done in order to verify the process efficiency.

In the QC the main aspects covered were: (1) the purity, including the chemical and radioisotopic purity, and (2) the recovery of the purified/recycled radium.

The first aspect was conducted in order to assure that the purity of the radium is high enough to be safely irradiated by accelerated protons, and assure that the presence of different contaminants/impurities will not set back the yield of the irradiation and the post irradiation treatments, respectively. As part of the purity check, radionuclidic and chemical purity analyses were performed.

The radionuclidic purity of the radium from available radioactive sources was done by in-situ gamma-spectrometric measurements of the whole sample or by taking a small aliquot of the sample. For the identification of the main chemical contaminants/impurities, the same aliquot was analysed using Inductively Coupled Plasma—Optical Emission Spectrometry (ICP-OES). This method was used successfully to identify the chemical impurities expected in the radium fraction.

The second aspect, the recovery of the radium, is as much important as the first one. Due to the application of the multistep radiochemical procedure, it is unavoidable to lose radium during the process. In order to minimize the losses, the applied procedures should be as simple as possible, comprising the minimum number of steps necessary to achieve the purity requirements. The recovery of the radium was verified during the process by gamma-spectrometry.

Figure 5:
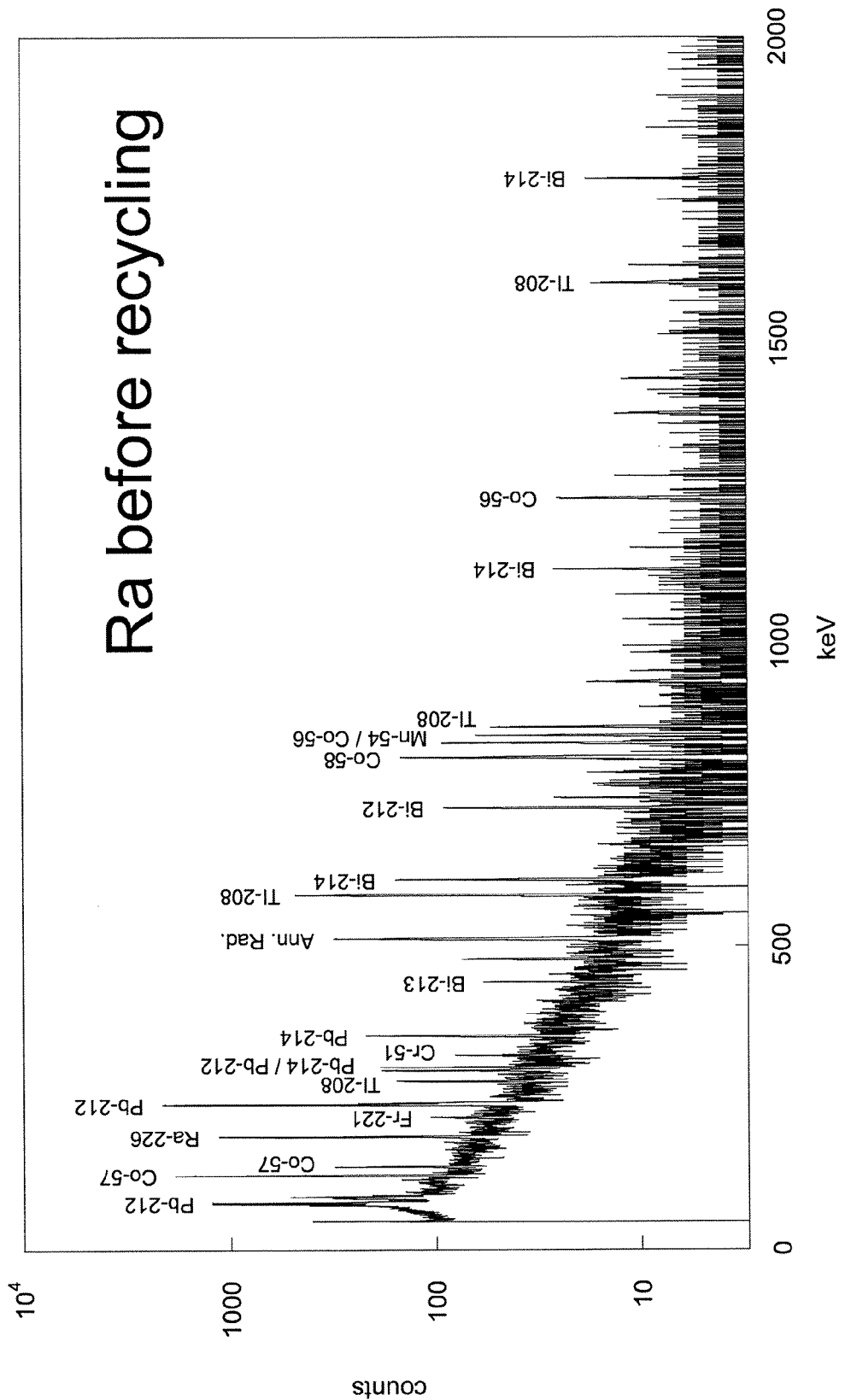
FIG. 5. Gamma spectra of the irradiated radium fraction before recycling.
Figure 6:
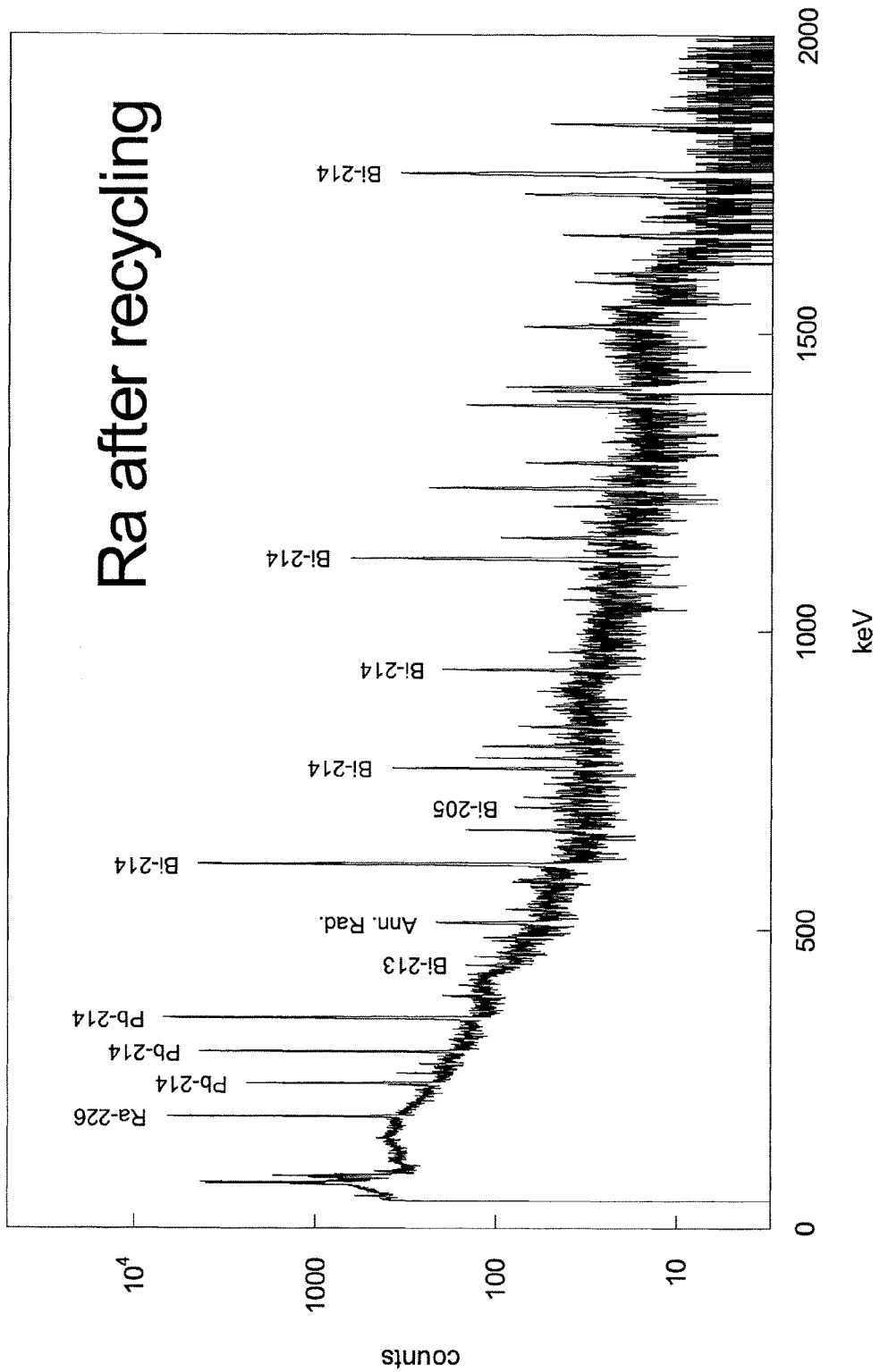
FIG. 6. Gamma spectra of the irradiated radium fraction after recycling according to the invention.

FIGS. 5 and 6 show the typical gamma-spectra of the radium fraction before and after recycling. From the spectra could be observed that the originally present radioisotopes of the transitional metals: $^{55}$Co, $^{56}$Co, $^{57}$Co, $^{67}$Ga, $^{57}$Ni, $^{51}$Cr, $^{48}$V, $^{52}$Mn, $^{54}$Mn, and $^{65}$Zn were well separated after applying the above detailed radiochemical procedure. Other detected isotopes in the spectra of FIG. 5, such as $^{208}$Tl, $^{212}$Pb and $^{221}$Fr are short living (half lives from minutes to hours) isotopes which are not relevant for the further purification. The typical radioisotopic purity of the radium obtained by using the above described procedure was higher than 99%.

In the spectra of FIGS. 5 and 6 "Ann. Rad." means "annihilation radiation".

What is claimed is:

1. A method for purifying up to 100 mg of Radium (Ra) for target preparation for $^{225}$Ac production from a radioactive source, the method comprising:
   a) determining the quality of the Radium material to be purified;
   b) contacting the radioactive source with a diluted mineral acid such that Radium is leached from the radioactive source into the diluted mineral acid to generate a leached pool;
   c) separating Radium from Al, Mg, Co, Ni, Zn and Fe in the leached pool with an acidic macroporous type cation exchange resin having about 35% porosity to generate a first set of one or more Radium containing fractions,
   d) separating Radium from Ba, Sr, and Pb in the first set of one or more Radium containing fractions by extraction chromatography with an Sr Resin to generate a second set of one or more Radium containing fractions;
   e) pooling the Radium containing fractions generated in step d); and
   f) concentrating the pooled Ra-containing fractions to generate purified Ra-containing fractions.

2. The method of claim 1, wherein the Radium is $^{226}$Ra.

3. The method of claim 1, wherein step (b) is repeated one or more times.

4. The method of claim 1, wherein the mineral acid in step (b) is diluted $HNO_3$.

5. The method of claim 4, wherein the $HNO_3$ has a concentration of about 0.1 M.

6. The method of claim 1, wherein $HNO_3$ or HCl is used as a mobile phase in step (c).

7. The method of claim 6, wherein the $HNO_3$ or HCl has a concentration range of about 0.1 M to about 4 M.

8. The method of claim 6, wherein the $HNO_3$ or HCl has a concentration of about 1M.

9. The method of claim 1, wherein the leached pool of step (b) is concentrated.

10. The method of claim 9, wherein the leached pool is concentrated with an evaporator and redissolved in a mineral acid.

11. The method of claim 10, wherein the mineral acid is $HNO_3$.

12. The method of claim 10, wherein the mineral acid is 0.1 M $HNO_3$.

13. The method of claim 1, wherein $^{222}$Rn is removed from the leached pool with one or more activated carbon traps.

14. The method of claim 1, wherein the extraction chromatography of step (d) is performed on a solid support material having an extractant system coated thereon.

15. The method of claim 14, wherein the extractant system comprises extraction chromatography such that Radium is contained in early fractions, Ba and Sr are contained in fractions with higher retention time and Pb is retained on the extractant system.

16. The method of claim 14, wherein the extractant system comprises at least one compound in accordance with general formula I in at least one compound in accordance with general formula II,

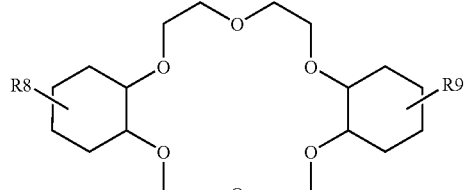

Formula I

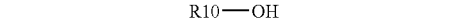

Formula II wherein in formula I:
R8 and R9 independently is H, $C_1$-$C_6$ alkyl, or t-butyl; and
wherein in formula II:
R10 is $C_4$ to $C_{12}$ alkyl; and wherein $HNO_3$ or HCl is used as a mobile phase.

17. The method of claim 14, wherein the extractant system is a crown ether in accordance with formula III:

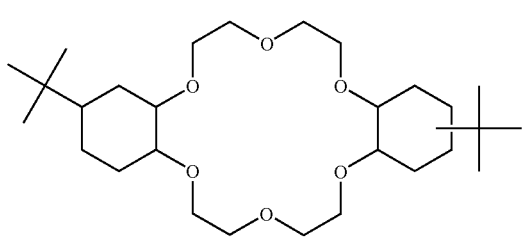

Formula III in 1-octanol.

18. The method of claim 14, wherein the extractant system is 4,4'-bis(t-butylcyclohexano)-18-crown-6 in 1-octanol.

19. The method of claim 14, wherein the extractant system is 4,5'-bis(t-butylcyclohexano)-18-crown-6 in 1-octanol.

20. The method of claim 14, wherein the solid support is selected from the group consisting of: a porous silica, an inert organic polymer and an acrylic ester non-ionic polymer.

21. The method of claim 1, wherein determining the quality of the Radium material to be purified is performed by γ-spectrometry.

22. The method of claim 21, wherein the γ-spectrometry is in situ γ-spectrometry.

23. The method of claim 1, wherein determining the quality of the Radium material to be purified is performed by Inductively Coupled Plasma Optical Emission Spectroscopy (ICP-OES).

24. The method of claim 1, wherein purified Ra-fractions of step (e) are concentrated by evaporation to dryness by means of an evaporator.

25. The method of claim 1, wherein purified Ra-fractions of step (e) are concentrated by evaporation to a wet residue by means of an evaporator.

26. A method for recycling $^{226}$Radium from radium sources irradiated with accelerated protons (p,2n), the method comprising:
   a) determining the quality of a Ra-containing solution to be purified;
   b) concentrating the Ra-containing solution by evaporation;
   c) removing trace amounts of organic compounds from the concentrated Ra-containing solution with a prefilter column;
   d) separating Radium from chemical contaminants by performing at least one cation exchange chromatography using a cation exchange resin;
   e) washing the cation exchange resin with low molar mineral acid to remove chemical contaminants;
   f) eluting Radium from the cation exchange resin with high molar mineral acid to generate partially purified Radium fractions;
   g) pooling and concentrating the partially purified Radium fractions; and
   h) subjecting the partially purified Ra fractions to at least one extraction chromatography step, wherein said extraction chromatography step is performed on a solid support material having an extractant system coated thereon, comprising at least one compound in accordance with general formula I in at least one compound in accordance with general formula II,

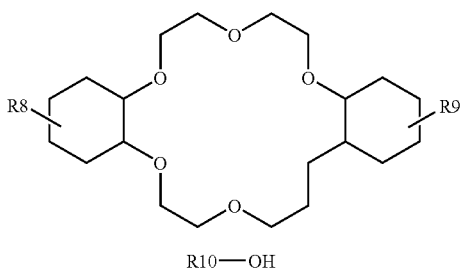

Formula I

Formula II wherein in formula I:
R8 and R9 independently is H, $C_1$-$C_6$ alkyl, or t-butyl; and wherein in formula II:
R10 is $C_4$ to $C_{12}$ alkyl; and wherein $HNO_3$ or HCl is used as mobile phase, i) recovering Radium from the early fractions, whereas Ba and Sr are contained in fractions with higher retention time;
   j) pooling Radium fractions; and
   k) concentrating the purified Ra fractions.

27. The method of claim 26, wherein the $^{226}$Radium is recycled from radium sources irradiated with accelerated protons (p,2n) to prepare targets for $^{225}$Ac production.

28. The method of claim 26, wherein the $^{226}$Radium is recycled from radium sources irradiated with accelerated protons (p,2n) after it is separated from $^{225}$Ac.

29. The method of claim 26, wherein the partially purified Ra-fractions of step (g) contain Radium as well as other chemically similar elements, such as Ba and Sr.

30. The method of claim 26, wherein the solution in step (a) is a mineral acid solution.

31. The method of claim 26, wherein the prefilter column is an inert solid support material.

32. The method of claim 26, wherein the cation exchange chromatography of step (d) is performed on a cation exchanger.

33. The method of claim 32, wherein the cation exchanger is an acidic macroporous cation exchanger.

34. The method of claim 26, wherein the Ra-containing solution in step (a) comprises HCl or $HNO_3$.

35. The method of claim 34, wherein the $HNO_3$ is within a concentration range of about 0.5 M to about 4 M.

36. The method of claim 34, wherein the HCl is within a concentration range of about 0.5 M to about 4 M.

37. The method of claim 26, wherein $HNO_3$ or HCl is used as a mobile phase and has a concentration range of about 0.1 M to about 4 M.

38. The method of claim 26, wherein $HNO_3$ or HCl is used as a mobile phase and has a concentration of about 1 M.

39. The method of claim 26, wherein the chemical contaminants are selected from the group consisting of Ag, Al, As, Be, Bi, Ca, Cd, Co, Cr, Cu, Fe, Ga, K, Li, Mg, Mn, Na, Ni, Pb, Sr, V, Zn, as well as mixtures thereof.

40. The method of claim 26, wherein the concentrating steps are carried out by evaporation.

41. The method of claim 26, wherein $^{222}$Rn decay products are removed from the Radium fractions with one or more activated carbon traps.

42. The method of claim 26, wherein the concentration of the high molar mineral acid of step (f) is about 0.5 to about 10 M.

43. The method of claim 26, wherein the concentration of the high molar mineral acid of step (f) is about 2 to about 6 M.

44. The method of claim 26, wherein the concentration of the high molar mineral acid of step (f) is about 4 M.

45. The method of claim 26, wherein the high molar mineral acid is $HNO_3$.

46. The method of claim 26, wherein the cation exchanger is an acidic cation exchange resin.

47. The method of claim 26, wherein the cation exchange resin is an acidic macroporous type cation exchange resin.

48. The method of claim 26, wherein the cation exchange resin is a resin in accordance with the following formula:

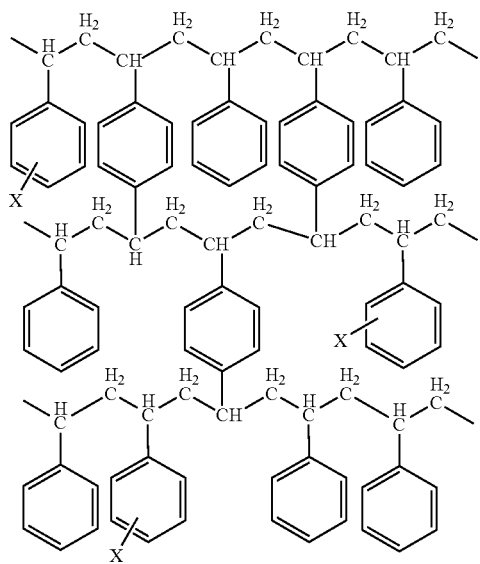

wherein X is $SO_3^-H^+$.

49. The method of claim 26, wherein the extractant system of step (h) is a crown ether in accordance with formula III:

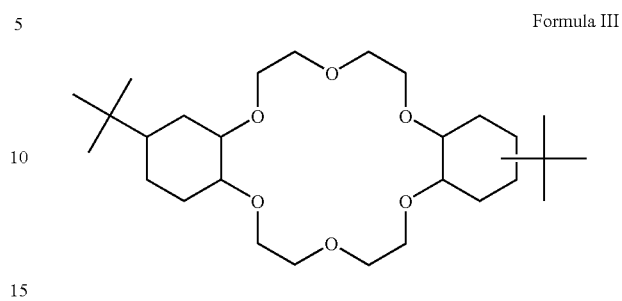

Formula III in 1-octanol.

50. The method of claim 48, wherein the extractant system is 4,4'-bis(t-butylcyclohexano)-18-crown-6 in 1-octanol.

51. The method of claim 48, wherein the extractant system is 4,5'-bis(t-butylcyclohexano)-18-crown-6 in 1-octanol.

52. The method of claim 26, wherein the solid support material in step (h) is a porous silica or an inert organic polymer.

53. The method of claim 26, wherein the solid support material in step (h) is an acrylic ester non-ionic polymer.

* * * * *